Jan. 8, 1935.　　　A. J. CUSICK　　　1,986,795
ADVERTISING SIGNBOARD
Filed June 21, 1933
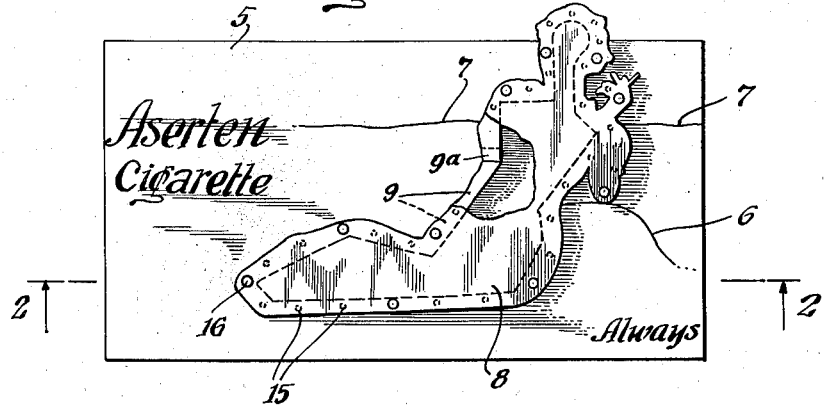
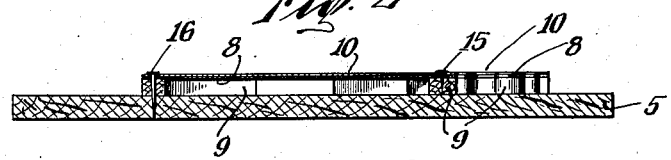
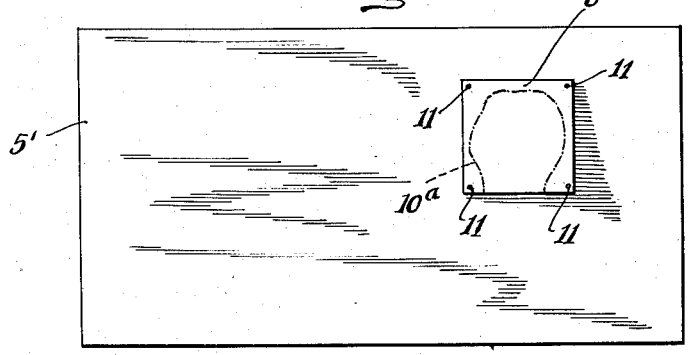
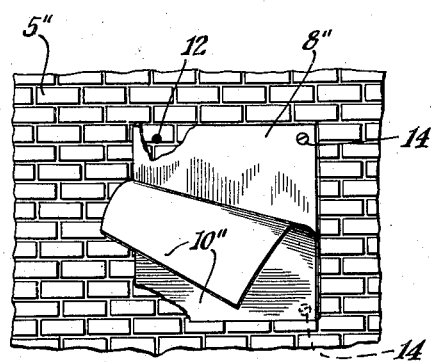
INVENTOR
Alden J. Cusick
BY
ATTORNEY Patented Jan. 8, 1935

1,986,795

UNITED STATES PATENT OFFICE 1,986,795

ADVERTISING SIGNBOARD

Alden J. Cusick, Mount Vernon, N. Y., assignor to General Outdoor Advertising Co. Inc., a corporation of New York Application June 21, 1933, Serial No. 676,824

2 Claims. (Cl. 40—125)

This invention relates to advertising signboards, and has for its general object the provision, as a new article of manufacture, of a novel and valuable assemblage of dissimilar advertising components.

By an advertising signboard is meant any backing, however constructed and wherever located for display to the general public, which presents a selected area or field for carrying an advertising message, such message including either a general background or a verbal message or both, in combination with one or more pictorial representations; such background and/or verbal message, and the one or more pictorial representations, constituting dissimilar advertising components which supplement or complement each other in giving the desired advertising message in its entirety.

The advertising signboards with which the present invention concerns itself especially are those outdoor signboards wherein the backing is of considerable expanse; most often these backings being provided by a specially erected structure built up of planking or by an exterior wall, whether of wood, brick, stone, plaster or other material, of a barn, warehouse, factory or other building.

Heretofore, such backings have been filled in with various advertising components,—the background and/or the verbal message, and the one or more pictorial representations,—either by poster or poster-sections adhesively applied, or by the hand and brush of a sign-painter. Where the backings have been of considerable expanse and the sign was a painted one in any part, the sign-painter has painted on the entire advertising message. But here a disadvantage has arisen, not so much one of cost and time, as one of failing to obtain absolute identity of form, color and shading of the various elements making up the one or more pictorial components of the advertising message. This absolute identity of appearance of a pictorial feature of the advertising of a certain commodity has sometimes, indeed very often, been one of the very important things sought. It is always attained, of course, in the printed advertising of that commodity, due to the absolute fidelity of reproduction of photolithographic or other printing processes. In cigarette advertising, for example, the lineaments, expression and complexion of a woman's face, the exact posture of her body or a member thereof, a particular flare of a part of her apparel, may have previously become so familiar to the general public as to have actually a real trade-mark value. And when this familiar figure is seen on painted signboards with the variations inevitably there to be encountered, such variations, whether or not consciously noted, will interfere with maximum advertising efficiency.

According to the present invention signboards of the large outdoor type hereinabove referred to are in the main, or at least in some part, painted as usual, but one or more pictorial components of the advertising message are mechanically produced and hence are precisely alike on different signboards. The components last referred to are photolithographically, or otherwise, set up by any practicable printing or duplicating method, on suitable posters, and these posters are adhesively attached at the proper locations on the signboards. On each such signboard the hand-painted parts of the latter are desirably smoothly blended with the posters and the picturization thereon, so that the ordinary passerby does not perceive that the advertising message is a composite having mechanically reproduced components and hand created ones.

The invention will be more clearly understood, and the various objects and advantages thereof fully appreciated, from the following description of various now preferred embodiments of the invention as illustratively shown in the accompanying drawing, in which Fig. 1 is a front elevation, partially broken away, of certain of said components as employed for setting up, say, an advertisement for a cigarette;

Fig. 2 is a horizontal section, taken on the line 2—2 of Fig. 1, and showing also an element omitted from Fig. 1, to wit, a poster;

Fig. 3 is a front elevation showing a signboard backing, and a different form of poster carrier than that shown in Fig. 1; and Fig. 4 is a fragmentary view showing a carrier like that of Fig. 3 and a convenient method of attachment of the same to the signboard when the latter is a portion of a brick wall, and also a poster in course of being attached to the carrier.

Referring to the drawing in detail, and first to Fig. 1 and Fig. 2, a backing 5, carries a complete advertising message here including a hand-painted verbal message made up of the words "Aserten cigarette" and the word "Always", a hand-painted background of any kind, color or colors, simplicity or elaboration, and including elements 6 and 7, and a woman's sitting figure, to be included within the outline of a sheet 8, which in the present case is shown as the poster carrier. The poster itself (not shown in Fig. 1; but seen at 10 in Fig. 2) will have thereon all the details of said figure; and all these posters on different signboards will be exactly alike, since all, as aforesaid, are photolithographically or otherwise printed exactly alike. Various details can be painted in by hand on the backing, or even on the carrier; such, for instance, as the lines 6 and 7,—the latter, say, to represent the horizon line of the ocean, and the former to represent a hillock of sand on a beach, on which the woman's figure is shown seated.

In cases where the backing is even and smooth, and of a nature to have the poster smoothly and securely attached thereto, a special poster carrier can be omitted,—and then merely a selected area of the backing itself will constitute the poster carrier. In many cases, however, such backing is of brick, stucco or the like, and even when of wood, is often shingled, clapboarded, or otherwise not of such a character as to provide the required surface. Then a special carrier, as the carrier 8 of Fig. 1, or any other special carrier pursuant to the invention, is employed. Such special carrier is desirably made of thin-gauge zinc or other metal, suitably fixed on the backing 5, at the desired place to establish the poster location. To such carrier, or to said location on the backing, if the latter be of the proper character directly to have a poster secured thereto, the poster is attached as by suitable adhesive, and with edge-matchings carefully made where the poster is a plural-sheet one in a manner well understood in the bill-posting art.

Where a special carrier, a sheet of metal as just mentioned or an equivalent, is attached to the backing, so that said carrier instead of the backing has the poster adhesively attached thereto, and where such special carrier is of considerable expanse, there can be provided a stiffening framework for the special carrier. Such a framework is shown in connection with the carrier 8; and is here illustrated as constituting a marginal frame 9, built up of elongate wooden members meeting each other at various angles and there connected by tongue and groove joinings 9a.

Where a special carrier is employed and it is, like the carrier 8, cut to the same outline as that of an object pictorially represented on the poster affixed thereto, the presence of said framing is rather an advantage than otherwise, as it adds depth to the general ensemble.

Referring next to Fig. 3, a backing 5', a special carrier 8' thereon for a poster, and an outline 10a of a woman's head on the poster, only are shown; such head being indicated in dot and dash lines as the poster itself is not illustrated.

In Fig. 4, a carrier 8", like the carrier 8', is shown in place on a backing fragmentarily illustrated at 5" as a brick wall; and here a poster 10" (but with the printing thereon omitted) is shown in course of being pasted on said carrier.

Both the carriers 8' and 8" differ from the carrier 8, in that the latter alone is cut to have its outline conform to the outline of the pictorial representation on the poster which is to be pasted on the carrier. Both of the carriers 8' and 8" further differ from the carrier 8, in that the latter alone has a portion projecting beyond a bounding edge of the backing. Also, since the carriers 8' and 8" are both of much smaller expanse than the carrier 8, a framework such as has been described, or an equivalent, is provided only for the carrier 8.

Where the backing is wood or other material which will hold a nail, the carrier can be nailed thereto as indicated at 11 in Fig. 3. Where the backing is brick-work, or the like, expansion sleeves of a familiar type, one of which is indicated at 12, are set at the proper points in the brick-work, and screws 14 are sent through the carrier and into such sleeves.

Where a special carrier is braced by a framework therebehind (as, for instance, illustratively shown in Figs. 1 and 2), the carrier can be attached to the framework, and then these as a unit can be secured to the backing, or the parts of such unit can be assembled against the backing, and nails, screws or the like employed to pierce both the carrier and the framework and enter the backing to secure the unit to the latter; and the poster can then be adhesively affixed to the carrier. As the parts are shown in Fig. 1, the carrier 8 is secured to the framework 9, by nails 15, first to build up the unit of the carrier and framework, and then said unit is secured to the backing by heavier nails (16). As the parts are shown in Fig. 2, the poster is affixed to the carrier at the signboard and after the carrier has been secured to the backing; the poster being cut, either before attachment to the carrier or after such attachment, to have its outline, coinciding with the limits of the pictorial representation thereon, match the outline of the carrier.

As hereinabove pointed out, an important aim of the invention is to have the same pictorial components of the complete advertising messages of different signboards all precisely alike. The lithographic or other printing of a poster so that the latter shall carry a pictorial representation, and the attachment of such poster to the signboard by pasting to contribute a pictorial representation to a signboard handpainted in part, as has been hereinabove explained, is the now preferred way of carrying out the invention. However, within the invention, the pictorial component can be applied to a paper, cardboard, canvas, metal or other auxiliary backing, but by any mechanical or quasi-mechanical method which obtains absolute or apparently absolute identity of line, area, coloring, and shade or tint, in all of a plurality of pictorial components for a number of different signboards. For instance, a plurality of such components all exactly or substantially exactly identical could be obtained, say at the factory, by the use of handpainting, but by the aid of stencils or pounce sheets, to mark off absolute identity of line and area on each, and then a painter could paint, from a single mix of paint, a first area or line or shading on all of a plurality of such components grouped together, and next paint, similarly from a single mix of paint but a different one from that first mentioned, a second area or line or shading on all of said plurality of components thus grouped, and so on. Such a mechanical or quasi-mechanical method of duplicating exactly or substantially exactly a plurality of pictorial components for different and perhaps widely separated signboards, is included herein within the term "printed" as employed in this specification and the appended claims.

Any special carrier according to the invention, whether or not rectangular as in the case of the carriers 8' and 8", can be fully or partially covered by the appropriate poster, whether such poster include merely a pictorial representation or such a representation and a part of the background therefor, and in the last mentioned case, if desired, the part or parts of the poster including background can be painted over by the sign-painter in a way to insure that merging together of all parts of the background, on the poster and on the backing beyond the limitation of the poster carrier, as to color, shade, tint and the like, will be absolutely perfect. The invention, obviously, may be carried out in various ways and in different combinations. No particularization of detail hereinabove contained as to structure, materials, effects, or otherwise, is to be taken in limitation of the invention, but only as illustrative of present preferences in carrying out the invention; it being pointed out that the scope of protection contemplated is to be taken from the appended claims, interpreted as broadly as is consistent with the prior art.

I claim:—

1. In a large outdoor advertising signboard of a size requiring a multi-sheet poster to cover its expanse, the combination of a backing defining such expanse, said backing carrying a pictorial representation and supplemental messages and background, said supplemental messages and background being applied to the backing at its point of location, the pictorial representation consisting of a printed or lithographed reproduction produced remote from the signboard and affixed thereto for pictorial co-operation with the supplemental messages and elements applied thereon.

2. An outdoor advertising signboard as defined in claim 1 wherein the pictorial representation is produced on a sheet, a frame substantially defining the outline of the pictorial presentation and secured to the sheet and backing whereby the pictorial representation is held thereby forwardly of the backing and presents a figure outstanding from and in advance of the supplemental messages and elements appearing thereon.

ALDEN J. CUSICK.